United States Patent
Henshaw et al.

(10) Patent No.: US 6,481,115 B1
(45) Date of Patent: Nov. 19, 2002

(54) SCALE READING APPARATUS

(75) Inventors: James R Henshaw, Stroud; Thomas J Stickland, Quedgeley, both of (GB)

(73) Assignee: Renishaw, PLC, Gloucestershire (GB)

( * ) Notice: Subject to any disclaimer, the term of this patent is extended or adjusted under 35 U.S.C. 154(b) by 85 days.

(21) Appl. No.: 09/685,587

(22) Filed: Oct. 11, 2000

(30) Foreign Application Priority Data

Oct. 15, 1999 (GB) ................................ 9924331

(51) Int. Cl.⁷ .......................... G01B 7/28; G01D 21/00
(52) U.S. Cl. .......................... 33/645; 33/1 PT; 33/1 N; 33/706; 33/707; 33/708
(58) Field of Search ................. 33/1 N, 1 PT, 33/706, 707, 708

(56) References Cited

U.S. PATENT DOCUMENTS

| | | | | |
|---|---|---|---|---|
| 4,492,150 A | * | 1/1985 | Yates | 417/481 |
| 4,926,566 A | * | 5/1990 | McMurtry et al. | 33/493 |
| 4,950,079 A | * | 8/1990 | McMurtry et al. | 33/503 |
| 4,959,542 A | * | 9/1990 | Stephens | 250/231.18 |
| 4,966,429 A | * | 10/1990 | Stephens et al. | 359/436 |
| 4,974,962 A | * | 12/1990 | Stephens et al. | 250/237 G |
| 4,975,571 A | * | 12/1990 | McMurtry et al. | 250/231.16 |
| 4,983,828 A | * | 1/1991 | Stephens | 250/231.16 |
| 5,026,985 A | * | 6/1991 | Ishizuka et al. | 250/231.16 |
| 5,033,817 A | * | 7/1991 | Stephens | 250/237 G |
| 5,184,014 A | * | 2/1993 | Stephens et al. | 250/231.16 |
| 5,302,820 A | * | 4/1994 | Henshaw et al. | 250/231.16 |
| 5,726,442 A | * | 3/1998 | Henshaw | 250/226 |
| 5,861,953 A | * | 1/1999 | Henshaw | 356/499 |
| 6,098,295 A | | 8/2000 | Feichtinger | |
| 6,262,802 B1 | * | 7/2001 | Kiyono | 250/307 |

FOREIGN PATENT DOCUMENTS

DE  197 51 019 A1  6/1999
EP  0 207 121 B1  1/1987

* cited by examiner

*Primary Examiner*—Diego Gutierrez
*Assistant Examiner*—Yaritza Guadalupe
(74) *Attorney, Agent, or Firm*—Oliff & Berridge, PLC

(57) ABSTRACT

A rotary ring 3 for use in scale reading apparatus has a scale on its outer circumference and is mounted on a rotary shaft 6. To reduce error caused by the rotary ring 3 not sitting concentrically on the rotary shaft 6, the inner circumference 5 of the rotary ring 3 and the outer circumference of the shaft 6 are both tapered. To compensate for eccentricity of the shaft, mounting screws 8 are provided in holes on the rotary ring to adjust the position of the rotary ring until it is concentric with the axis of rotation of the shaft.

16 Claims, 2 Drawing Sheets

SCALE READING APPARATUS

The present invention relates to scale reading apparatus.

A known form of opto-electronic scale reading apparatus for measuring relative displacement of two members comprises a scale on one of the members, having scale marks defining a periodic pattern, a read head provided on the other member, means for illuminating the scale, periodic diffraction means for interacting with light from the scale marks to produce interference fringes having movement relative to the read head and detecting means in the read head responsive to the fringes to produce a measure of the displacement.

An example of such apparatus is disclosed in EP-A-0 207 121 and also U.S. Pat. No. 4,974,962, each of which shows the means for illuminating and the periodic diffraction means in the read head. U.S. Pat. No. 4,926,566 discloses a method of producing a scale, in the form of a flexible tape produced by rolling, the pitch of the scale marks being 20 µm or 40 µm for example. The illuminating means, the diffraction means and the detecting means responsive to the fringes may be integrated in the read head in the manner described in U.S. Pat. No. 5,302,820.

The above forms of apparatus basically measure linear displacement. However, for measuring rotary displacement, such a scale may be held around a cylindrical surface which rotates in use with a shaft or other rotary part relative to a read head—see DE-A-197 51 019 for example. Such apparatus is typically called a rotary or angle or shaft encoder for example.

Referring to FIG. 1, there is shown schematically a loop of scale 1 having scale marks defining a periodic pattern, the loop of scale being fixed for example by adhesive to the outer circumferential surface of a rotary ring (not shown in FIG. 1), reference numeral 2 designating a read head in which are means for illuminating the scale marks, periodic diffraction means for interacting with light from the scale marks to produce interference fringes having movement relative to the read head and detecting means in the read head responsive to the fringes to produce a measure of the rotary displacement of the shaft or other rotary part to which the ring is attached in use.

However, a problem is that the rotary ring might not sit concentrically on the rotary element on which it is mounted.

According to the present invention there is provided a rotary ring for use in scale reading apparatus, the ring carrying on an outer circumferential surface a length of scale having scale marks defining a periodic pattern and readable by a read head of such apparatus, wherein an inner circumferential surface of the ring is provided by a tapered surface at an angle relative to the axis of the ring.

The length of scale could be for use in opto-electronic scale reading apparatus in which diffraction means interferes with light from the scale marks or the scale reading apparatus could be of the magnetic or capacitive type for example.

The present invention also comprises scale reading apparatus comprising a rotary ring according to the present invention and a read head for reading the marks on the length of scale.

The angle that the tapered surface makes with the axis of the ring could be 15°, for example.

The present invention will now be described, by way of example, with reference to the accompanying drawing, in which:

FIG. 1 is a schematic representation of a rotary encoder;

FIG. 2a) shows a rotary ring according to an example of the present invention and which may be used in such an encoder;

FIG. 2b) is a sectional view through A—A in FIG. 2a);

FIG. 2c) is a side view of the rotary ring;

Figure 1:
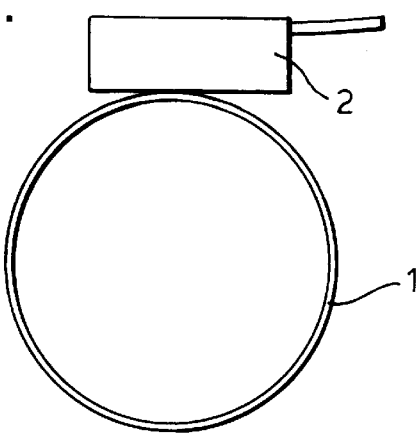
Figure 2A:
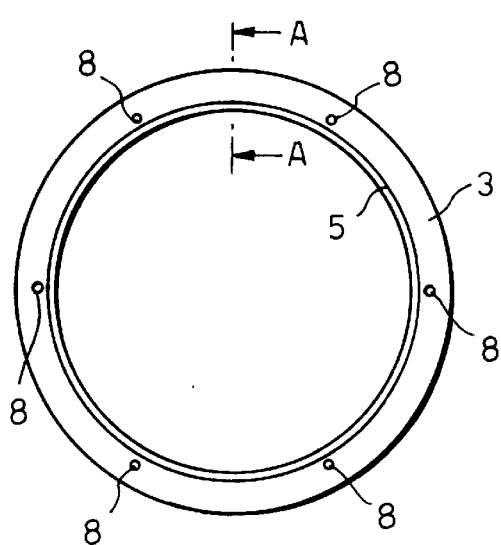

Referring first to FIGS. 2a), 2b) and 2c), a ring 3, which is metallic for example, has an outer circumferential surface which receives a length of scale in the form of metallic tape with equally spaced lines of optical contrast, to form the rotary part of a rotary encoder which comprises, together with the rotary part, a read head (see FIG. 1 for example). By way of example, the outer circumferential surface is formed with a groove 4 to receive the length of scale. The length of scale is placed in the groove 4 with a curable adhesive between it and the ring 3 and, at the region where the two ends of the scale meet, the positions of the ends are adjusted so that the ends are in phase, whereafter the adhesive is cured. Alternatively, for example, the length of scale could be welded to the ring 3.

Figure 3:
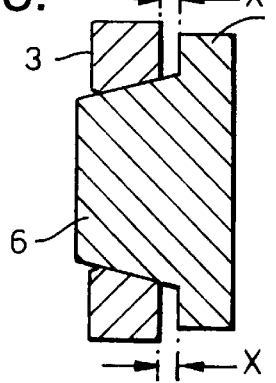
FIGS. 3 and 4 show the ring mounted on to a rotary shaft.
Figure 4:
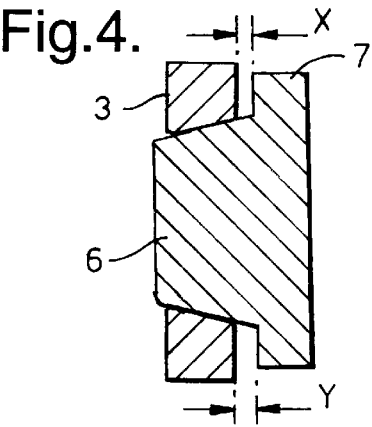

To reduce the error caused by such a rotary ring not sitting concentrically on the rotary part on which it is mounted, the rotary ring 3 has an inner circumferential surface which is a tapered inner circumferential surface 5, for mounting on to a tapered shaft 6—see FIGS. 3 and 4. This removes the need for close tolerances on the diameters of the ring 3 and the shaft 6. During installation, the ring 3 is pushed along the shaft 6 until a good fit is obtained.

By measuring the distance between the ring 3 and a shoulder 7 on the shaft 6 at a number of points (FIG. 3), the squareness of the ring 3 to the shaft taper 6 can easily be checked. The taper angle ($\alpha$) relative to the axis of the ring 3 serves to magnify a small radial error into a larger axial error. This allows precise centring of the ring 3 relative to the shaft taper 6. For a 15° taper angle, the magnification factor is around 3.7.

Figure 5:
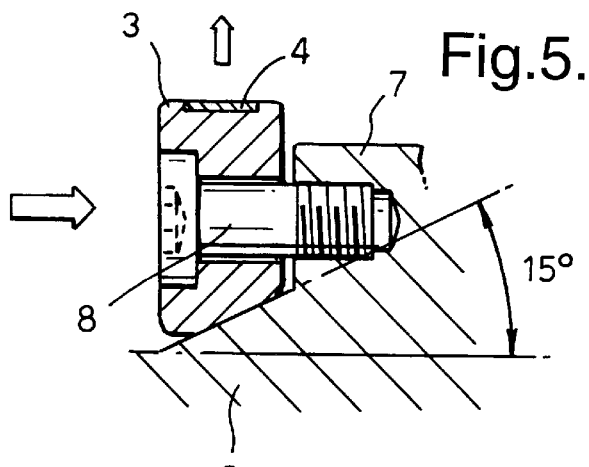
FIGS. 5 and 6 are sections of the rotary ring showing the position of mounting screws.
Figure 6:
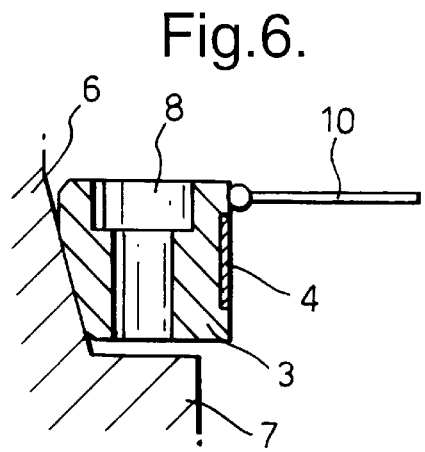

Compensation can be made for eccentricity in the shaft 6 by mounting the rotary ring 3 such that it is not concentric with the shaft but with the axis of rotation of the shaft. This can be achieved by adjustment of mounting screws in holes 8 of the ring 3 seen in FIGS. 5 and 6 so that the ring is no longer sitting perpendicular to the shaft. The mounting screws and their holes (8) are generally parallel to the axis of rotation. If in FIG. 4, y>x, then the axis of the ring 3 is now slightly above that of the shaft 6. The effect of this is that the ring is no longer concentric with the taper axis.

The ring can easily be pulled to the correct shape because it is thin and flexible. The tapered angle means that tightening a particular mounting screw will pull the local portion of the ring down the taper and outwards from the centre. By adjusting all the screws in turn it is possible to centre the ring very accurately.

Measuring means 10 such a dial gauge (or a microscope for inspection) are used to determine the position of the outside diameter of the ring, or the scale surface at each adjustment screw location. By rotating the ring so that each screw in turn is next to the measuring apparatus it is possible to adjust each screw so that an identical reading is obtained at each screw all of the way round the ring. This is because, as a screw is tightened, the ring is locally pulled down the tapered shaft and hence outwards. Loosening the screw results in the ring locally moving inwards. If the measuring apparatus agree to ±2 µm at each mounting screw, then the ring will typically be centred to better than 1 µm.

Between the mounting screws the ring may be distorted inwards or outwards which contributes to a higher order undulation error. This error is small and cyclic with a frequency equating with the number of mounting screws. The amplitude of this modulation will reduce as the number of mounting screw locations increases.

Figure 7:
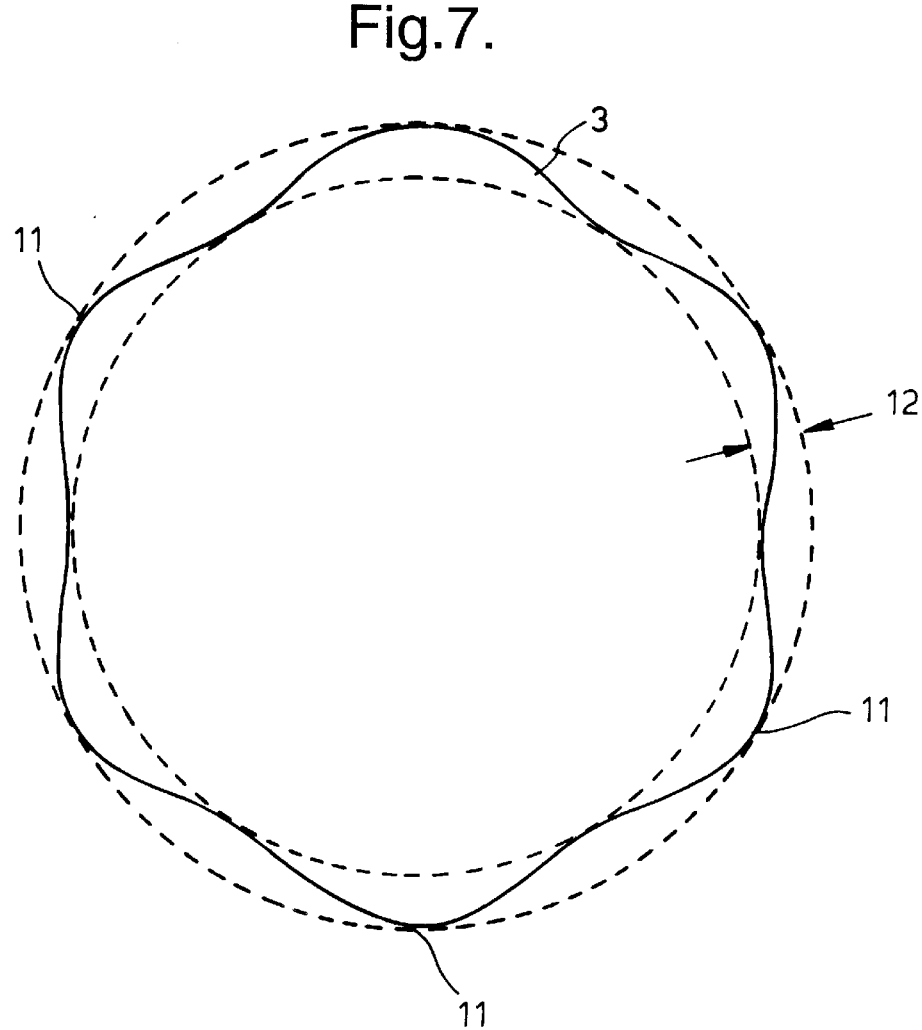
FIG. 7 shows the modulation of the rotary ring.

FIG. 7 shows a rotary ring 3 with six mounting screw locations 11 at which gauge readings agree to within 2 µm. This typically results in the ring being centred better than 1 µm and an edge run-out value 12 of ±10 µm. Thus it is possible to reduce the eccentricity to a very small value even though the edge run-out might be as high as ±10 µm.

Figure 2B:
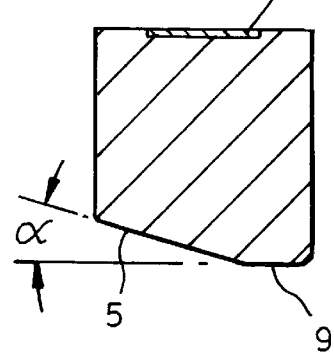
Figure 2C:
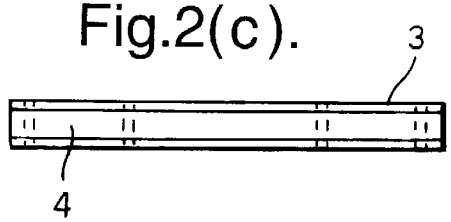

It will be noted from FIG. 2b) for example, that the ring 3 also has an inner circumferential surface 9 which is not tapered, so that the ring may be fitted on to a non-tapered rotary part if desired.

What is claimed is:

1. A rotary ring for use in scale reading apparatus, the ring carrying on an outer circumferential surface a length of scale having scale marks defining a periodic pattern and readable by a readhead of such apparatus, wherein an inner circumferential surface of the ring is provided by a tapered surface at an angle relative to the axis of the ring.

2. A rotary ring as in claim 1, wherein the ring also has an inner circumferential surface (5) which is not tapered.

3. A rotary ring as in claim 1, wherein the angle the tapered surface makes with the axis of the ring is 15°.

4. A rotary ring as in claim 1, wherein a plurality of mounting screws are provided in corresponding holes around the circumference of the rotary ring, such that when the ring is mounted on a shaft, its position relative to the shaft may be altered by adjusting the mounting screws.

5. A rotary ring according to claim 4, wherein the mounting screws and the holes are generally parallel to the axis of rotation of the ring.

6. A rotary ring for use in a scale reading apparatus, the rotary ring being provided with scale marks defining a periodic pattern on its outer surface, said scale marks being readable by a readhead of the scale reading apparatus, wherein an inner circumferential surface of the rotary ring is provided by a tapered surface at an angle relative to an axis of the rotary ring.

7. A rotary ring as in claim 6, wherein the rotary ring also has an inner circumferential surface which is not tapered.

8. A rotary ring as in claim 6, wherein the angle the tapered surface makes with the axis of the rotary ring is about 15°.

9. A rotary ring as in claim 6, wherein a plurality of mounting screws are provided in corresponding holes around the circumference of the rotary ring, such that when the rotary ring is mounted on a shaft, its position relative to the shaft may be altered by adjusting the mounting screws.

10. A rotary ring according to claim 9, wherein the mounting screws and the holes are generally parallel to an axis of rotation of the rotary ring.

11. A rotary ring for use in a scale reading apparatus, the rotary ring being provided on a surface thereof with scale marks defining a periodic pattern, said scale marks being readable by a readhead of the scale reading apparatus, wherein an inner circumferential surface of the rotary ring is provided by a tapered surface at an angle relative to an axis of the rotary ring.

12. A rotary ring as in claim 11, wherein the scale marks defining a periodic pattern are provided on an outer surface of the rotary ring.

13. A rotary ring as in claim 11, wherein the rotsry ring also has an inner circumferential surface which is not tapered.

14. A rotary ring as in claim 11, wherein the angle the tapered surface makes with the axis of the rotary ring is about 15°.

15. A rotary ring as in claim 11, wherein a plurality of mounting screws are provided in corresponding holes around the circumference of the rotary ring, such that when the rotary ring is mounted on a shaft, its position relative to the shaft may be altered by adjusting the mounting screws.

16. A rotary ring according to claim 15, wherein the mounting screws and the holes are generally parallel to an axis of rotation of the rotary ring.

* * * * *